(12) United States Patent
Wong

(10) Patent No.: US 8,065,281 B2
(45) Date of Patent: Nov. 22, 2011

(54) METHOD AND APPARATUS FOR FACILITATING DISTRIBUTED PROCESSING OF DATABASE OPERATIONS

(75) Inventor: Daniel ManHung Wong, Sacramento, CA (US)

(73) Assignee: Oracle International Corporation, Redwood Shores, CA (US)

( * ) Notice: Subject to any disclaimer, the term of this patent is extended or adjusted under 35 U.S.C. 154(b) by 397 days.

(21) Appl. No.: 11/780,359

(22) Filed: Jul. 19, 2007

(65) Prior Publication Data
US 2009/0024566 A1    Jan. 22, 2009

(51) Int. Cl.
*G06F 17/00* (2006.01)
(52) U.S. Cl. ........................ 707/694; 707/736
(58) Field of Classification Search .............. 707/1–10, 707/694, 736, 999.001–999.01
See application file for complete search history.

(56) References Cited

U.S. PATENT DOCUMENTS

| 7,242,681 B1 * | 7/2007 | Van Bokkelen et al. ...... 370/389 |
| 2003/0167277 A1 * | 9/2003 | Hejlsberg et al. ............. 707/102 |
| 2006/0053112 A1 * | 3/2006 | Chitkara et al. .................. 707/9 |

* cited by examiner

*Primary Examiner* — Mohammad Ali
*Assistant Examiner* — John Hocker
(74) *Attorney, Agent, or Firm* — Shun Yao; Park, Vaughan, Fleming & Dowler LLP

(57) ABSTRACT

One embodiment of the present invention provides a system that facilitates distributed processing of database operations. During operation, the system receives a database operation at a distributed command processor, wherein the database operation includes a query language command. Next, the system performs a set of non-data processing operations associated with the database operation to obtain a set of non-data processing results. The system then sends the query language command to a database, which enables the database to execute the query language command to obtain a result.

14 Claims, 3 Drawing Sheets

METHOD AND APPARATUS FOR FACILITATING DISTRIBUTED PROCESSING OF DATABASE OPERATIONS

BACKGROUND

1. Field of the Invention

The present invention relates to databases. More specifically, the present invention relates to a method and apparatus for distributed processing of database operations.

2. Related Art

As database technology continues to evolve, organizations are beginning to use database systems to perform a number of non-data processing operations in addition to processing queries to access data. For example, an organization may authenticate a user before allowing the user to execute a Structured Query Language (SQL) command on a database. Furthermore, the organization may configure the database to issue alerts for SQL commands that access a particular table. As these associated non-data processing operations become increasingly more common, the amount of time required to execute a database operation (which includes a query language command and associated non-data processing operations) has increased. This can create performance problems for database systems that process frequent commands from numerous users.

Hence, what is needed is a method and apparatus for executing a database operation without the problems listed above.

SUMMARY

One embodiment of the present invention provides a system that facilitates distributed processing of database operations. During operation, the system receives a database operation at a distributed command processor, wherein the database operation includes a query language command. Next, the system performs a set of non-data processing operations associated with the database operation to obtain a set of non-data processing results. The system then sends the query language command to a database, which enables the database to execute the query language command to obtain a result.

In a variation on this embodiment, performing the set of non-data processing operations can involve: determining if an audit option is active at the database; firing a trigger; processing stored procedures; processing the database operation through an Intrusion Detection System (IDS); checking the syntax of the query language command; checking the syntax of the database operation; determining if a user associated with the database operation is authorized to issue the query language command; masking the result; decrypting data associated with the database operation; encrypting the data associated with the database operation; and encrypting the result.

In a variation on this embodiment, receiving the database operation involves receiving the database operation from an application-server.

In a further variation, upon receiving the result from the database, the system sends the result and the set of non-data processing results to the application-server.

In a further variation, after receiving the result from the database, the system performs a second set of non-data processing operations associated with the database operation to obtain a second set of non-data processing results. The system then sends the result, the set of non-data processing results, and the second set of non-data processing results to the application-server.

In a variation on this embodiment, receiving the database operation involves receiving the database operation from a demultiplexer, which identifies a subset of distributed command processors from a set of distributed command processors to send the database operation to based on a database operation-type associated with the database operation.

In a variation on this embodiment, sending the query language command to the database involves sending the query language command over a secure communication channel to the database.

In a variation on this embodiment, the database includes the distributed command processor.

In a variation on this embodiment, after performing the set of non-data processing operations, the system determines if the set of non-data processing results includes a query language command rejection. If so, the system rejects the database operation. If not, the system sends the query language command to the database.

DETAILED DESCRIPTION

Figure 1:
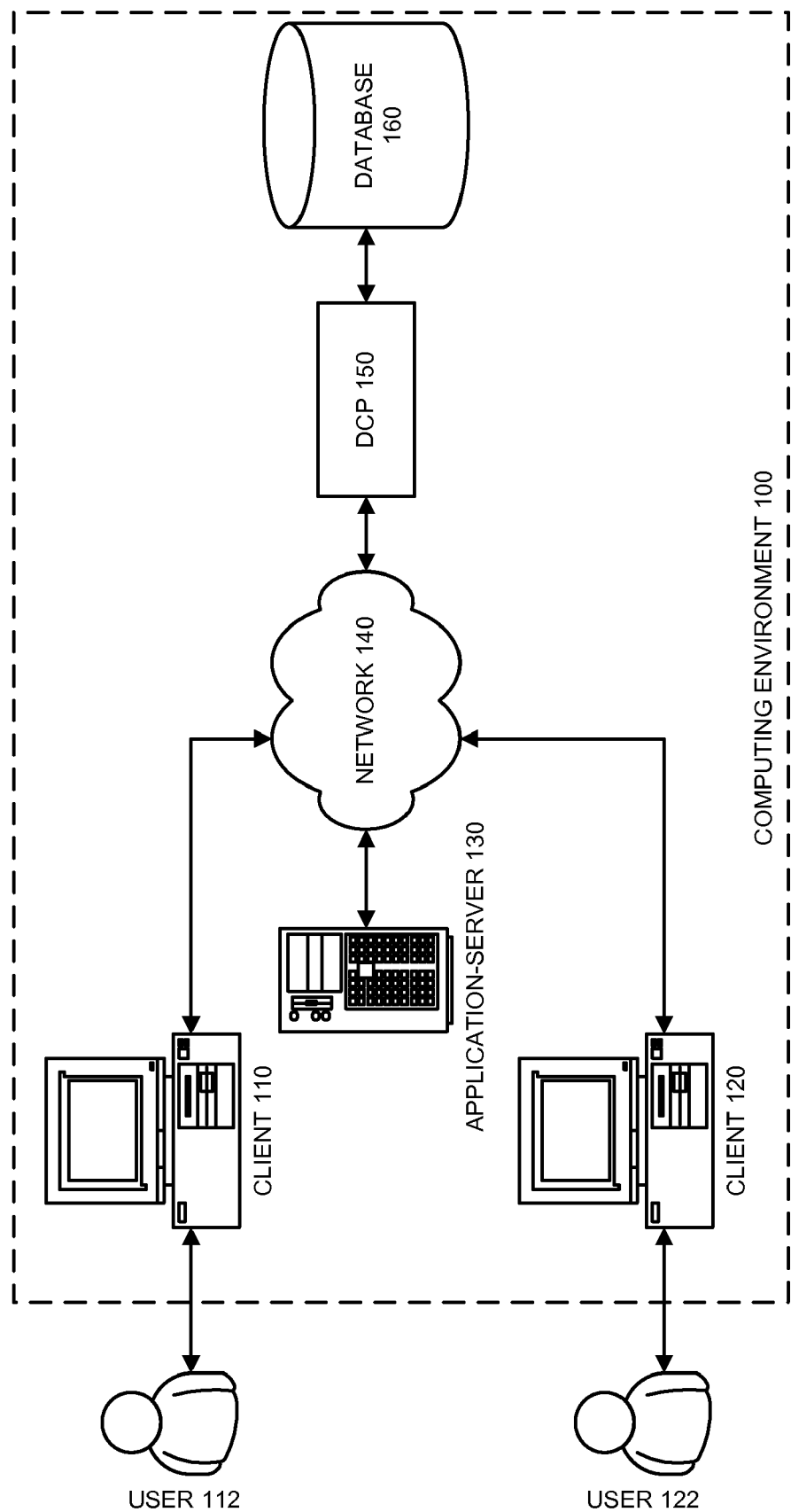
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

One embodiment of the present invention provides a distributed command processor (DCP) that facilitates distributed processing of database operations. Note that a database operation can include a Structured Query Language (SQL) command and a set of non-data processing operations. These non-data processing operations can involve any auxiliary activity or operation that a system may perform in conjunction with the SQL command. For example, the non-data processing operations can involve user authentication or auditing of database operations.

In one embodiment of the present invention, the SQL command can be any query language command and is not restricted to SQL commands.

In one embodiment of the present invention, the DCP performs pre-processing operations by performing the non-data processing operations associated with a database operation before sending the SQL command associated with the database operation to a database to execute. This enables the database to allocate resources for SQL processing without allocating resources for non-data processing operations.

In one embodiment of the present invention, the DCP performs post-processing operations. This involves performing the non-data processing operations associated with a database operation after receiving a response from the database executing the SQL command associated with the database operation. This enables the database to allocate resources for SQL processing without allocating resources for non-data processing operations.

In one embodiment of the present invention, if the result of the non-data processing operations includes a rejection of the database operation, the DCP rejects the database operation and does not send the SQL command to the database. For example, suppose that the DCP includes an Intrusion Detection System (IDS). If the IDS determines that the database operation is suspect, the DCP rejects the database operation without sending the SQL command to the database.

In one embodiment of the present invention, the database includes the DCP as the front-end to the database.

In one embodiment of the present invention, a demultiplexer receives the database operation and determines a subset of DCPs to which to send the database operation. This determination is based on the type of database operation received or the user who sent the database operation to the demultiplexer.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, computing environment 100 includes client 110, client 120, application-server 130, network 140, DCP 150 and database 160.

Client 110 and client 120 can generally include any node on a network including computational capability and including a mechanism for communicating across the network.

Application-server 130 can generally include any computational node including a mechanism for servicing requests from a client for computational and/or data storage resources. Furthermore, application-server 130 can include any system capable of executing an application that can interact with database 160 via DCP 150.

Network 140 can generally include any type of wired or wireless communication channel capable of coupling together computing nodes. This includes, but is not limited to, a local area network, a wide area network, or a combination of networks. In one embodiment of the present invention, network 140 includes the Internet.

DCP 150 can generally include any system for executing or performing non-data processing operations. In other words, DCP 150 can generally include any system that can execute or perform any activity except executing query language commands, such as Structured Query Language (SQL) commands. Note that DCP 150 is a front-end system to database 160. Thus, in order to access database 160, client 110, client 120, and application-server 130 first access DCP 150. Furthermore, the separation between DCP 150 and database 160 is transparent to client 110, client 120, and application-server 130.

In one embodiment of the present invention, DCP 150 can execute SQL commands.

In one embodiment of the present invention, DCP 150 can include or can interact with an External Security Module (ESM). An ESM can generally include any physical or logical device created to be highly resistant to unauthorized access. A physical ESM is referred to as a Hardware Security Module (HSM). In an HSM, all sensitive data is stored in a separate physical storage device with its own access control policies. The physical storage device and associated software interfaces are usually certified or tested against both physical and software-based intrusion attempts.

In one embodiment of the present invention, DCP 150 can be an ESM.

Database 160 can generally include any type of system for storing data in non-volatile storage. This includes, but is not limited to, systems based upon magnetic, optical, and magneto-optical storage devices, as well as storage devices based on flash memory and/or battery-backed up memory.

In one embodiment of the present invention, client 110 and client 120 access DCP 150 via network 140.

In one embodiment of the present invention, client 110 and client 120 access DCP 150 via application-server 130.

In one embodiment of the present invention, database 160 includes DCP 150.

User 112 and user 122 can generally include: an individual; a group of individuals; an organization; a group of organizations; a computing system; a group of computing systems; or any other entity that can interact with computing environment 100.

In one embodiment of the present invention, user 112 and user 122 can be clients.

Distributed Command Processor

Figure 2:
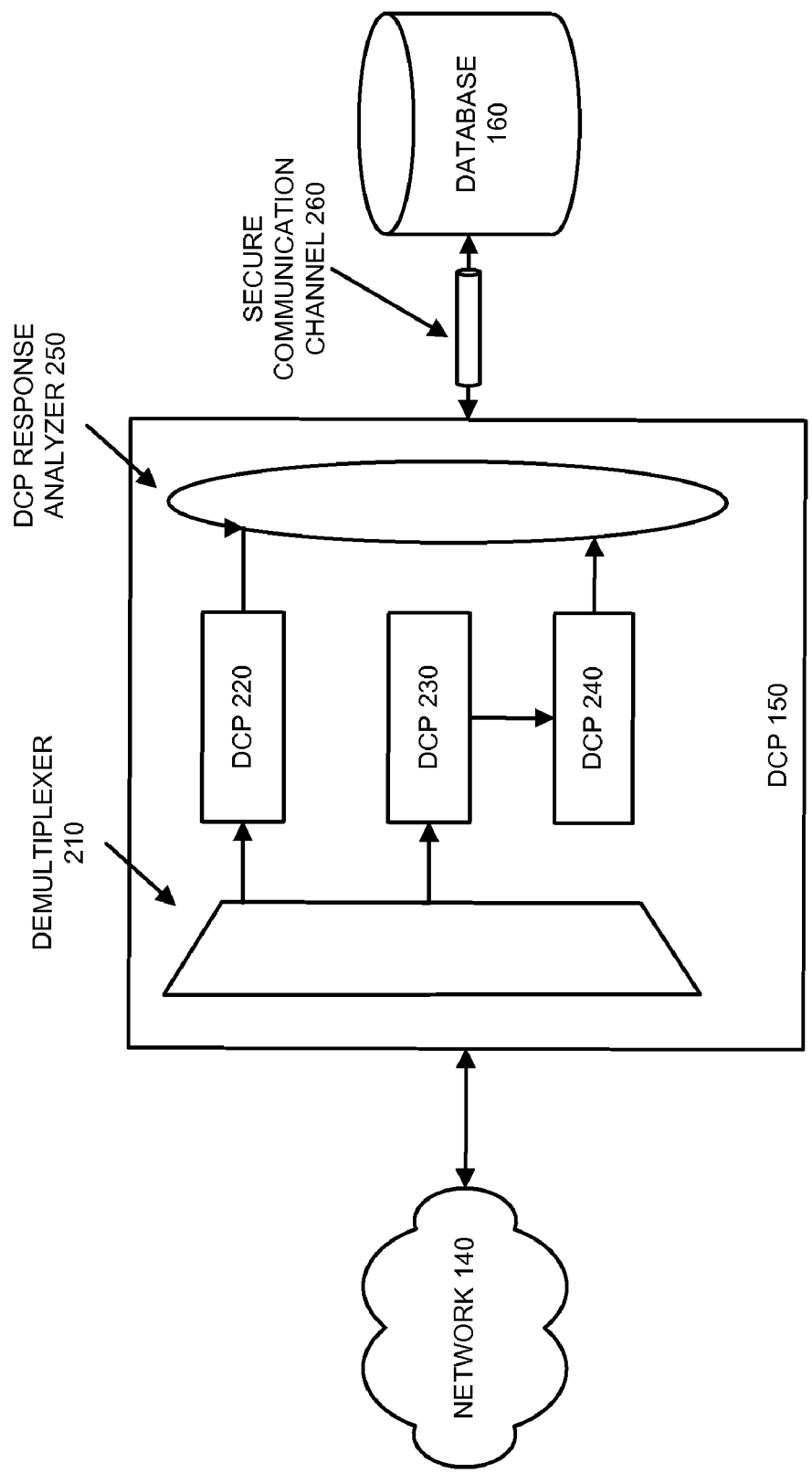
FIG. 2 illustrates a distributed command processor (DCP) in accordance with an embodiment of the present invention.

FIG. 2 illustrates a distributed command processor (DCP) 150 in accordance with an embodiment of the present invention. Note that DCP 150 can include multiple DCPs. In this embodiment, DCP 150 includes demultiplexer 210, DCP 220, DCP 230, DCP 240, and DCP response analyzer 250.

Demultiplexer 210 can generally include any mechanism for determining a subset of DCPs from a set of DCPs to which to send a database operation. Note that demultiplexer 210 can receive the database operation from client 110, client 120, or application-server 130. Furthermore, note that demultiplexer 210 can send the database operation to a single DCP or multiple DCPS (either serially or in parallel).

In one embodiment of the present invention, demultiplexer 210 can be a stand-alone system. In this embodiment, DCP 150 does not host demultiplexer 210.

In one embodiment of the present invention, demultiplexer 210 determines which DCPs to send a database operation to based on characteristics of: the database operation; a SQL command associated with the database operation; an entity that sent the database operation, such as user 112 or application-server 130; a pre-determined configuration of demultiplexer 210; or any other method for determining which DCPs are to receive the database operation.

In one embodiment of the present invention, DCPs are associated with different users. In this embodiment, different DCPs may perform the same or similar non-data processing operations for different users and/or organizations. For example, suppose that user 112 works for organization A and user 122 works for organization B. Furthermore, suppose that DCP 220 is associated with organization A and that DCPs 230 and 240 are associated with organization B. In this example, demultiplexer 210 sends database operations from user 112 to DCP 220 and database operations from user 122 to DCP 230. This facilitates the separation of private information associated with organization A from the private information associated with organization B while still enabling both organizations to access database 160.

In one embodiment of the present invention, DCP 220 and DCP 230 process a database operation in parallel.

In one embodiment of the present invention, DCP 230 processes a database operation, and then sends the database operation to DCP 240 to process.

In one embodiment of the present invention, DCP 240 can use a result of DCP 230's processing of the database operation to facilitate DCP 240 processing the database operation.

In one embodiment of the present invention, DCP 220, DCP 230, and DCP 240 can be stand-alone systems. In this embodiment, DCP 150 does not host DCP 220, DCP 230, and DCP 240.

DCP response analyzer 250 can generally include any system for analyzing the response to the database operation from the various DCPs. This can involve determining whether to send to database 160 a Structured Query Language (SQL) command that the database operation includes. Furthermore, this can involve combining the responses to the database operation from the various DCPs to facilitate executing the database operation.

In one embodiment of the present invention, DCP response analyzer 250 can be a stand-alone system. In this embodiment, DCP 150 does not host DCP response analyzer 250.

In one embodiment of the present invention, DCP 150 communicates with database 160 over secure communication channel 260. Only DCP 150 and database 160 can access secure communication channel 260. This helps ensure that any SQL command that database 160 receives is first pre-processed by DCP 150.

In one embodiment of the present invention, DCP 150 does not communicate with database 160 over secure communication channel 260, but instead communicates with database 160 over a standard communication channel. In this embodiment, DCP 150 can use a digital signature to sign the SQL command to indicate to database 160 that DCP 150 pre-processed the database operation associated with the SQL command. Note that DCP 150 and database 160 can use any process known to those familiar with the art to verify that DCP 150 pre-processed the database operation before database 160 executes the SQL command.

In one embodiment of the present invention, DCP 150 maintains a cache of metadata that database 160 stores to facilitate secure communication between DCP 150 and database 160. To maintain this cache of metadata, DCP 150 can periodically query database 160 for metadata updates.

In one embodiment of the present invention, DCP 150 can register a callback system with database 160 to maintain the cache of metadata. In this embodiment, changes in the metadata results in database 160 automatically triggering an alert which informs DCP 150 that DCP 150's cache of metadata may be out of date. In response, DCP 150 can update the cache of metadata by accessing database 160 to obtain updated metadata.

In one embodiment of the present invention, DCP 150 can post-process the database operation. This can involve demultiplexer 210 receiving from database 160 a result of database 160 executing the SQL command. Demultiplexer 210 can then send the result and the database operation to a subset of the DCPs to post-process. These DCPs can then send the post-processing result to DCP response analyzer 250, which forwards the post-processing result to an entity that first sent the database operation to DCP 150 for execution.

In one embodiment of the present invention, DCP response analyzer 250 may send the post-processing result to a different entity than the entity that first sent the database operation to DCP 150.

In one embodiment of the present invention, DCP response analyzer 250 may send the post-processing result to a third-party entity in addition to the entity that first sent the database operation to DCP 150.

Processing a Database Operation

Figure 3:
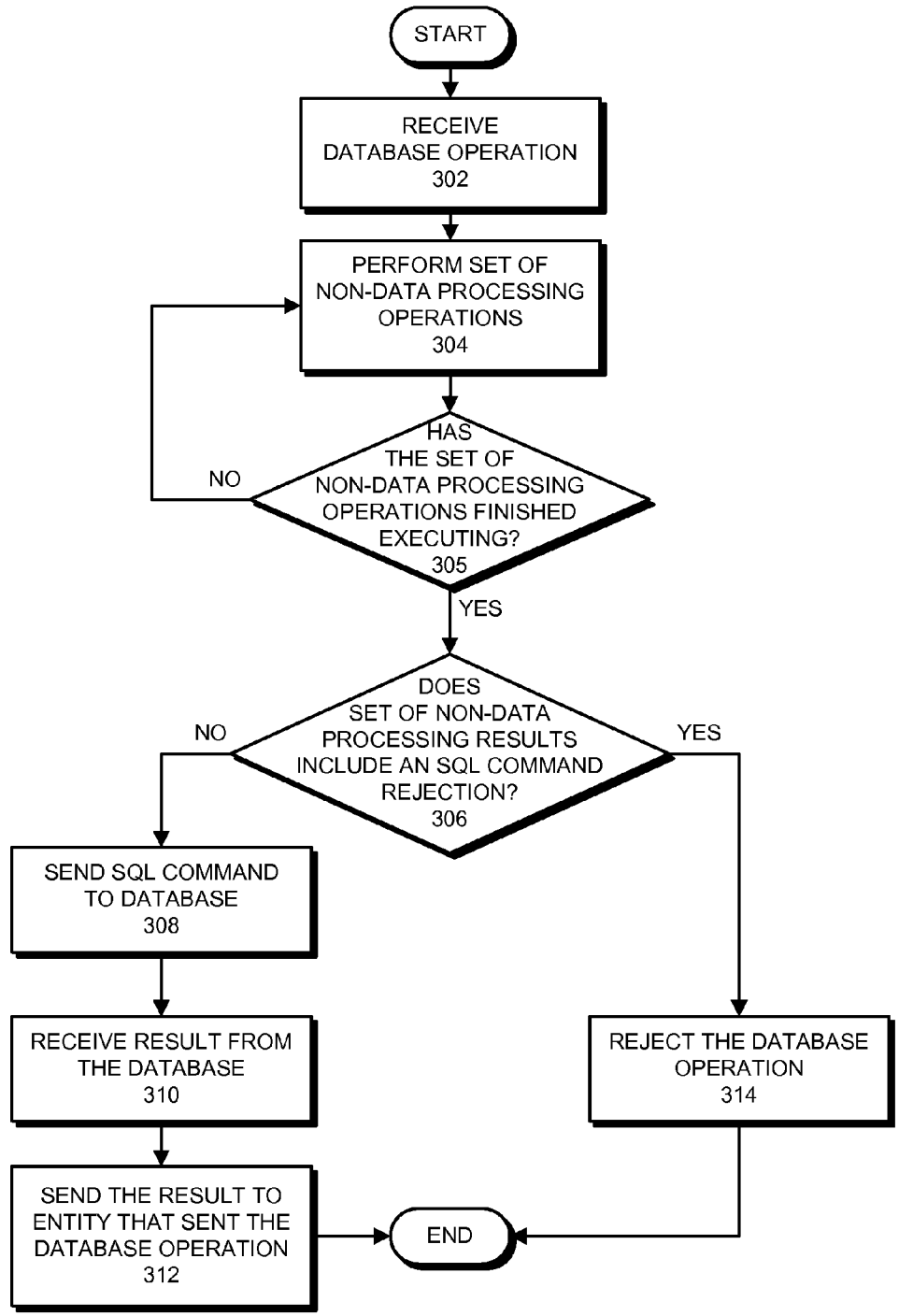
FIG. 3 presents a flowchart illustrating the process of processing a database operation in accordance with an embodiment of the present invention.

FIG. 3 presents a flowchart illustrating the process of processing a database operation in accordance with an embodiment of the present invention. The process begins when DCP 150 receives a database operation (operation 302). Note that the database operation includes a query language command, such as a SQL command.

In one embodiment of the present invention, DCP 150 receives the database operation from application-server 130. This may occur in response to user 112 or client 110 interacting with application-server 130, or application-server 130 may automatically send the database operation without the interaction of user 112 or client 110.

In one embodiment of the present invention, DCP 150 receives the database operation from user 112 or client 110.

In one embodiment of the present invention, DCP 150 receives the database operation from demultiplexer 210. In this embodiment, demultiplexer 210 identifies a subset of DCPs from a set of DCPs to send the database operation to based on the type of the database operation.

Next, DCP 150 performs a set of non-data processing operations (operation 304) associated with the database operation to obtain a set of non-data processing results.

In one embodiment of the present invention, performing the set of non-data processing operations can involve performing any non-SQL command or activity. For example, the set of non-data processing operations can involve: determining if an audit option is active at database 160; firing a trigger; processing stored procedures; processing the database operation through an Intrusion Detection System (IDS); checking the syntax of the SQL command; determining if user 112, who is associated with the database operation, is authorized to issue the SQL command; decrypting data associated with the database operation; encrypting data associated with the database operation; and performing any other activity related to the database operation.

In one embodiment of the present invention, DCP 150 serially executes the set of non-data processing operations.

In one embodiment of the present invention, DCP 150 uses the result of a non-data processing operation to facilitate executing a second non-data processing operation.

In one embodiment of the present invention, DCP 150 executes in parallel a subset of non-data processing operations. In this embodiment, the subset which is executed in parallel does not depend on the result of executing a non-data processing operation from the subset of non-data processing operations.

DCP 150 then determines if the set of non-data processing operations have finished executing (operation 305). If not, DCP 150 continues performing the set of non-data processing operations. If so, DCP 150 determines if the set of non-data processing results includes an SQL command rejection (operation 306). If so, DCP 150 rejects the database operation (operation 314) and the process completes without sending the SQL command to database 160. If not, DCP 150 sends the SQL command to database 160 (operation 308), which enables database 160 to execute the SQL command to obtain a result. Note that database 160 does not need to perform any additional operations associated with the SQL command because DCP 150 executes all additional operations associated with the SQL command before sending the SQL command to database 160.

For example, suppose that executing a given database operation involves determining if user 112 has permission to request the execution of a SQL command associated with the given database operation. Before sending the SQL command to database 160, DCP 150 checks user 112's privileges. If user 112 does not have permission to request the execution of the SQL command, DCP 150 rejects user 112's request and does not send the SQL command to database 150. If user 112 does have permission to request the execution of the SQL command, DCP 150 sends the SQL command to database 160 to be executed.

In one embodiment of the present invention, DCP 150 determines if a subset of the non-data processing operations has finished executing before proceeding to the next operation. In this embodiment, the subset of the non-data processing operations may or may not produce an SQL command rejection. Furthermore, the remaining non-data processing operations, which are not included with the subset of non-data processing operations, can continue executing while DCP 150 proceeds to the next operation because the remaining non-data processing operations may not produce an SQL command rejection.

In one embodiment of the present invention, rejecting the database operation involves DCP 150 undoing the effects of any actions executed in response to executing the database operation. Note that this may involve undoing operations performed on database 160.

In one embodiment of the present invention, DCP response analyzer 250 determines if the set of non-data processing results includes a SQL command rejection.

In one embodiment of the present invention, no non-data processing operations associated with the database operation may exist. In this embodiment, DCP 150 sends the SQL command to database 160 without performing any non-data processing operations.

In one embodiment of the present invention, DCP 150 sends the SQL command to database 160 while DCP 150 is executing non-data processing operations. In this embodiment, the non-data processing operations do not involve operations that can affect the execution of the SQL command.

In one embodiment of the present invention, sending the command to database 160 involves sending the command over secure communication channel 260.

In one embodiment of the present invention, database 160 includes DCP 150. In this embodiment, DCP 150 and database 160 communicate internally with each other, for example through shared memory or internal messaging.

Next, DCP 150 receives the result from database 160 (operation 310). Note that the result may include: data retrieved from database 160 in response to the SQL command; an acknowledgment value, which indicates that the SQL command executed; a failure code, which indicates that the SQL command failed to execute (note that the failure code may also indicate why the SQL command failed to execute); or any other value that can be associated with database 160 executing the SQL command. Furthermore, note that the result may also be an empty response, in which case DCP 150 does not receive a result associated with the SQL command from database 160.

In one embodiment of the present invention, receiving the result from database 160 involves receiving the result over secure communication channel 260.

Next, DCP 150 sends the result to the entity that sent the database operation to DCP 150 (operation 312). Note that this entity can include: application-server 130, client 110, client 120, user 112, user 122, or any other entity capable of sending a database operation to DCP 150 and capable of receiving a result associated with executing a SQL command associated with the database operation.

In one embodiment of the present invention, DCP 150 sends the result to a third-party entity.

In one embodiment of the present invention, DCP 150 sends the result to the entity that sent the database operation to DCP 150 and to the third-party entity.

In one embodiment of the present invention, DCP 150 sends the set of non-data processing results along with the result of executing the SQL command to the entity. For example, DCP 150 may send the result of executing a stored procedure along with the result of executing the SQL command to the entity.

In one embodiment of the present invention, after receiving the result from database 160, DCP 150 performs a second set of non-data processing operations associated with the database operation to obtain a second set of non-data processing results. In addition to the operations involved in performing the set of non-data processing operations, the second set of non-data processing operations can involve: masking the result; decrypting data associated with the result; encrypting data associated with the result; encrypting the result; sending the result to a third party; and any other operation associated with the database operation or the result. DCP 150 then sends the result, the set of non-data processing results, and the second set of non-data processing results to the entity that sent the database operation to DCP 150.

In one embodiment of the present invention, demultiplexer 210 receives the result from database 160. In this embodiment, demultiplexer 210 identifies a subset of DCPs from the set of DCPs to send the result to. This subset of DCPs then performs the second set of non-data processing operations.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating distributed processing of database operations from a demultiplexer at a distributed command processor (DCP), the method comprising:
    receiving a database operation from a demultiplexer at a distributed command processor (DCP),
    wherein the DCP is in a front-end machine coupled to and separate from a database system and comprises an external security module that applies access control policies to stored sensitive data and prevents unauthorized accesses,
    wherein the DCP communicates with the database system through a secure communication channel accessible only by the DCP and the database system,
    wherein the demultiplexer identifies the DCP from a set of DCPs and dispatches the database operation to the DCP based on a database operation-type; wherein the demultiplexer identifies a subset of distributed command processors from a set of distributed command processors to send the database operation to based on a database operation-type.

wherein the DCP processes non-data-processing operations;

determining, at the DCP, whether the database operation is a non-data-processing operation;

in response to the database operation being a non-data-processing operation, performing at the DCP the non-data-processing operation to obtain a non-data-processing result;

in response to the database operation being a data-processing operation: sending the data-processing operation to the database system; and receiving a data-processing result from the database system; and returning the non-data-processing result or the data-processing result.

2. The method of claim 1, wherein performing the non-data-processing operation comprises at lease one of:

determining if an audit option is active at the database;
firing a trigger;
processing stored procedures;
processing the database operation through an Intrusion Detection System (IDS);
checking the syntax of the query language command;
checking the syntax of the database operation;
determining if a user associated with the database operation is authorized to issue the query language command;
masking the result;
decrypting data associated with the database operation;
encrypting the data associated with the database operation; and
encrypting the result.

3. The method of claim 1, wherein after receiving the data-processing result from the database system, the method further comprises:

performing a second non-data processing operation associated with the database operation to obtain a second non-data-processing result; and
returning the non-data-processing or data-processing result and the second non-data-processing result.

4. The method of claim 1, wherein sending the data-processing operation to the database system involves sending the data-processing operation over the secure communication channel to the database system.

5. The method of claim 1, wherein the database includes the distributed command processor.

6. The method of claim 1, wherein after performing the non-data-processing operation, the method further comprises:

determining if the non-data-processing result includes a query language command rejection;
if so, rejecting the database operation; and
if not, sending the data-processing operation to the database system.

7. A non-transitory computer-readable storage medium storing instructions that when executed by a computer cause the computer to perform a method for facilitating distributed processing of database operations, the method comprising:

receiving a database operation from a demultiplexer at a distributed command processor (DCP),
wherein the DCP is in a front-end machine coupled to and separate from a database system and comprises an external security module that applies access control policies to stored sensitive data and prevents unauthorized accesses,
wherein the DCP communicates with the database system through a secure communication channel accessible only by the DCP and the database system,
wherein the demultiplexer identifies the DCP from a set of DCPs and dispatches the database operation to the DCP based on a database operation-type; wherein the demultiplexer identifies a subset of distributed command processors from a set of distributed command processors to send the database operation to based on a database operation-type.
wherein the DCP processes non-data-processing operations;
determining, at the DCP, whether the database operation is a non-data-processing operation;
in response to the database operation being a non-data-processing operation, performing at the DCP the non-data-processing operation to obtain a non-data-processing result;
in response to the database operation being a data-processing operation: sending the data-processing operation to the database system; and
receiving a data-processing result from the database system; and
returning the non-data-processing result or the data-processing result.

8. The non-transitory computer-readable storage medium of claim 7, wherein performing the non-data-processing operation comprises at lease one of:

determining if an audit option is active at the database;
firing a trigger;
processing stored procedures;
processing the database operation through an Intrusion Detection System (IDS);
checking the syntax of the query language command;
checking the syntax of the database operation;
determining if a user associated with the database operation is authorized to issue the query language command;
masking the result;
decrypting data associated with the database operation;
encrypting the data associated with the database operation; and
encrypting the result.

9. The non-transitory computer-readable storage medium of claim 7, wherein after receiving the data-processing result from the database system, the method further comprises:

performing a second non-data-processing operation associated with the database operation to obtain a second non-data-processing result; and
returning the non-data-processing or data-processing result and the second non-data-processing result.

10. The non-transitory computer-readable storage medium of claim 7, wherein sending the data-processing operation to the database system involves sending the data-processing operation over the secure communication channel to the database system.

11. The non-transitory computer-readable storage medium of claim 7, wherein the database includes the distributed command processor.

12. The non-transitory computer-readable storage medium of claim 7, wherein after performing the non-data-processing operation, the method further comprises:

determining if the non-data-processing result includes a query language command rejection;
if so, rejecting the database operation; and
if not, sending the data-processing operation to the database system.

13. An apparatus that facilitates distributed processing of database operations, comprising:

a receiving mechanism configured to receive a database operation from a demultiplexer at a distributed command processor (DCP), wherein the DCP is in a front-end machine coupled to and separate from a database system and comprises an external security module that applies access control policies to stored sensitive data and prevents unauthorized accesses, wherein the DCP communicates with the database system through a secure communication channel accessible only by the DCP and the database system, wherein the demultiplexer identifies the DCP from a set of DCPs and dispatches the database operation to the DCP based on a database operation-type; wherein the demultiplexer identifies a subset of distributed command processors from a set of distributed command processors to send the database operation to based on a database operation-type.

wherein the DCP processes non-data-processing operations;

determining, at the DCP, whether the database operation is a non-data-processing operation;

a performing mechanism configured to perform at the DCP the non-data-processing operation to obtain a non-data-processing result, in response to the database operation being the non-data-processing operation;

a sending mechanism configured to, in response to the database operation being a data-processing operation, send the data-processing operation to the database system;

wherein the receiving mechanism is further configured to, in response to the database operation being a data-processing operation, receive a data-processing result from the database system; and wherein the sending mechanism is configured to return the non-data-processing result or the data-processing result.

14. The apparatus of claim 13, wherein the receiving mechanism is further configured to receive the database operation from a demultiplexer, which identifies a subset of distributed command processors from a set of distributed command processors to send the database operation to based on a database operation-type.

* * * * *